US008506066B2

(12) United States Patent
Kikkawa

(10) Patent No.: US 8,506,066 B2
(45) Date of Patent: Aug. 13, 2013

(54) IMAGE FORMING APPARATUS

(75) Inventor: Fumitaka Kikkawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/416,066

(22) Filed: Mar. 9, 2012

(65) Prior Publication Data

US 2012/0236072 A1 Sep. 20, 2012

(30) Foreign Application Priority Data

Mar. 17, 2011 (JP) ................................ 2011-058908

(51) Int. Cl.

| | |
|---|---|
| ***B41J 2/19*** | (2006.01) |
| ***B41J 2/165*** | (2006.01) |
| ***F24D 19/08*** | (2006.01) |
| ***F16K 24/04*** | (2006.01) |

(52) U.S. Cl.

USPC ................ 347/92; 347/36; 137/198; 137/199

(58) Field of Classification Search

USPC .................. 347/92, 6, 36; 137/2, 154, 170.1, 137/170.2, 183, 198, 199

See application file for complete search history.

(56) References Cited

U.S. PATENT DOCUMENTS

| | | | | |
|---|---|---|---|---|
| 2,684,684 | A * | 7/1954 | Stevenson | 137/199 |
| 2,729,228 | A * | 1/1956 | Stevenson | 137/199 |
| 2,908,282 | A * | 10/1959 | Maisch | 137/199 |
| 4,329,696 | A * | 5/1982 | Denlinger et al. | 347/6 |
| 4,524,793 | A * | 6/1985 | Silverwater | 137/198 |
| 4,813,446 | A * | 3/1989 | Silverwater et al. | 137/198 |
| 5,211,200 | A * | 5/1993 | Cassidy | 137/199 |
| 5,305,793 | A * | 4/1994 | Cencula | 137/198 |
| 5,963,237 | A * | 10/1999 | Ikkatai et al. | 347/85 |
| 6,276,784 | B1 * | 8/2001 | Ikkatai et al. | 347/85 |
| 2010/0283822 | A1 * | 11/2010 | Arnold et al. | 347/92 |
| 2011/0050816 | A1 | 3/2011 | Katoh et al. | |
| 2011/0134184 | A1 | 6/2011 | Katoh et al. | |
| 2011/0141167 | A1 | 6/2011 | Kikkawa et al. | |
| 2012/0033020 | A1 | 2/2012 | Kikkawa | |

FOREIGN PATENT DOCUMENTS

| | | |
|---|---|---|
| JP | 11-320901 | 11/1999 |
| JP | 2009-291959 | 12/2009 |

* cited by examiner

*Primary Examiner* — Matthew Luu
*Assistant Examiner* — Alexander D Shenderov
(74) *Attorney, Agent, or Firm* — Cooper & Dunham LLP

(57) ABSTRACT

In an image forming apparatus ejecting droplets of a liquid, a valve unit is provided to connect a liquid tank with a discharge flow path connecting the valve unit with a waste liquid tank. The valve unit has a first valve having a communication path, a spring biasing the first valve to open, a valve sheet, and a second valve to open or close the discharge flow path in conjunction with movement of the first valve. When a discharging device is not driven, the first valve maintains an open state while the second valve maintains a close state. When the discharging device is driven, the second valve achieves an open state and air flows through the communication path. When the liquid flows through the communication path, the first valve is moved to achieve a closed state while the second valve maintains the open state, thereby closing the discharge flow path.

17 Claims, 9 Drawing Sheets

IMAGE FORMING APPARATUS

CROSS-REFERENCE TO RELATED APPLICATIONS

This patent application is based on and claims priority pursuant to 35 U.S.C. §119 to Japanese Patent Application No. 2011-058908, filed on Mar. 17, 2011 in the Japan Patent Office, the entire disclosure of which is hereby incorporated herein by reference.

TECHNICAL FIELD

This disclosure relates to an image forming apparatus, and particularly to an image forming apparatus having a recording head to eject droplets.

BACKGROUND

Image forming apparatuses having a recording head to eject droplets such as ink droplets have been used for printers, facsimiles, copiers, and multifunctional machines, and specific examples thereof include inkjet recording devices. Such image forming apparatuses record images by ejecting droplets such as ink droplets from a recording head toward a recording material such as paper sheets, overhead projection (OHP) sheets, and other materials to which an ink can be adhered, to form an ink image on the recording material. Such image forming apparatuses are broadly classified into serial image forming apparatuses in which a recording head ejects droplets while moving in a main scanning direction to form an image on a recording material fed in a sub-scanning direction, and line image forming apparatuses having a fixed line recording head ejecting droplets on a recording material fed in a direction perpendicular to the line recording head.

In this application, image forming apparatuses mean apparatuses which eject droplets so as to be adhered to a recording material such as paper, yarn, fiber, fabric, leather, metal, plastic, glass, wood, and ceramic to form an image thereon. In addition, image formation means not only formation of a meaningful image such as letters and figures but also formation of a meaningless image such as patterns (i.e., mere adhesion of droplets on a recording material). Further, ink means not only so-called inks but also other liquids for use in image formation such as recording liquids, fixing liquids, and other liquids (e.g., DNA samples, photoresist liquids, patterning liquids, and liquid resins). Furthermore, image means not only two-dimensional images but also images formed on a three-dimensional object and three dimensional images themselves formed by ink.

There is an image forming apparatus which includes a recording head, a head tank (i.e., sub-tank, or buffer tank) to supply an ink to the recording head, and a main tank (i.e., ink cartridge) which is detachably attached to the main body of the image forming apparatus while containing the ink therein and which feeds the ink to the head tank through a tube using a pump.

In such an image forming apparatus having a head tank, when a used main tank (i.e., ink cartridge) is detached from the image forming apparatus, a problem (hereinafter referred to as an air suction problem) in that a small amount of air enters into the tube connecting the main tank with the head tank is often caused. This air suction problem is also caused when the tube has high air permeability.

The air bubbles thus formed in the tube (i.e., ink passage) are fed to the head tank and stays in the head tank as the ink in the head tank is consumed for recording images. In this regard, the air bubbles tend to stay in an upper portion of the head tank due to an ascending force for the bubbles. In addition, when the image forming apparatus has a filter member between the head tank and the recording head, the air bubbles tend to remain in the head tank because of being unable to pass through the filter.

When such a head tank containing air bubbles therein is set under a high temperature condition, the air bubbles expand, thereby increasing the internal pressure of the head tank. In general, nozzles of a recording head have a negative pressure so that the ink therein has meniscus so as not to drop from the nozzles. However, when the internal pressure of the head tank increases, the nozzles cannot maintain the negative pressure, thereby making it impossible to perform normal image formation.

In attempting to discharge air bubbles from a head tank, there is a choking method in which the ink in the ink cartridge is pressed while a valve is formed on a portion of the tube connecting the main tank with the head tank; the surface of the nozzles of the recording head is capped while closing the valve; the ink is discharged from the nozzles using a suction pump to decrease the internal pressure of the head tank; and the valve is opened to form large pressure difference, thereby discharging the air bubbles in the head tank from the nozzles.

However, this choke method has a drawback in that since the air discharging operation is performed at once utilizing the large pressure difference, a large amount of ink is discharged together with air, thereby incurring waste.

In addition, there is a proposal for a method in which an ink level sensor, an air discharging hole, and a valve (non-return valve) are provided on upper portions of a head tank, and the air discharging hole is covered with a discharging cap connected with a discharging tube pump to discharge air bubbles from the head tank using the tube pump.

This method has a drawback in that it is necessary to perform control such that the flow path connected with the discharging cap and the flow path connected with a cap covering the nozzle surface have to be switched with each other, and in addition two ink level sensors are necessary, thereby increasing the number of parts, resulting in increase of the costs of the apparatus.

For these reasons, the inventors recognized that there is a need for an image forming apparatus in which air bubbles can be discharged from the head tank by a simple mechanism without performing complex control while reducing the amount of the discharged ink.

SUMMARY

As an aspect of this disclosure, an image forming apparatus is provided which includes a recording head having nozzles to eject droplets of a liquid, a liquid tank to store the liquid to be supplied to the recording head; a waste liquid tank to store a waste of the liquid; a valve located on the liquid tank while communicating therewith; a discharge flow path connecting the valve with the waste liquid tank; and a discharging device located on the discharge flow path to feed a fluid from the liquid tank to the waste liquid tank.

The valve includes a first valve member which has a communication path connecting the liquid tank with the discharge flow path and which is movable to open and close the discharge flow path; a valve sheet located on the discharge flow path and having an opening serving as a part of the discharge flow path, wherein the first valve is contacted with or separated from the valve sheet to close or open the discharge flow path; a biasing member to bias the first valve member in such a direction that the first valve member is separated from the valve sheet; and a second valve member to open and close the discharge flow path in conjunction with the movement of the first valve member.

When the discharging device is not driven, the first valve member opens the discharge flow path while the second valve member closes the discharge flow path. When the discharging device starts to be driven, the second valve member opens the discharge flow path while the first valve member keeps the discharge flow path opening. In this regard, when the first and second valve members open the discharge flow path and air flows to the discharge flow path through the communication path of the first valve member, the first valve member keeps the discharge flow path opening, but when the liquid flows through the communication path of the first valve member, the first valve member is moved by the liquid to close the discharge flow path, thereby preventing the liquid from flowing through the discharge path while the second valve member keeps the discharge flow path opening although the second valve member is moved by the movement of the first valve member.

Alternatively, the valve can have a configuration such that when the discharging device starts to be driven, the first and second valve members keep the discharge flow path opening even though air flows to the discharge flow path through the communication path of the first valve member, whereas, in a case in which the liquid flows through the communication path of the first valve member while the first and second valve members open the discharge flow path, the first valve member is moved by the liquid and the second valve member is moved to close the discharge flow path in conjunction with the movement of the first valve member.

Alternatively, an image forming apparatus is provided which includes a recording head having nozzles to eject droplets of a liquid, a liquid tank to store the liquid to be supplied to the recording head; a waste liquid tank to store a waste of the liquid; a valve located on the liquid tank while communicating therewith; a discharge flow path connecting the valve with the waste liquid tank; and a discharging device located on the discharge flow path to feed a fluid from the liquid tank to the waste liquid tank.

The discharging device is a reversible discharging device to close the discharge flow path when being stopped. The valve includes a valve member, which has a communication path connecting the liquid tank with the discharge flow path and which is movable to open and close the discharge flow path; a valve sheet located on the discharge flow path and having an opening serving as a part of the discharge flow path, wherein the valve member is contacted with or separated from the valve sheet to close or open the discharge flow path; and a biasing member to bias the valve member in such a direction that the valve is separated from the valve sheet.

When the discharging device is not driven, the valve member opens the discharge flow path, and when the discharging device starts to be driven in a forward direction, the valve member keeps the discharge flow path opening even though air flows to the discharge flow path through the communication path of the valve member, whereas, in a case in which the liquid flows through the communication path of the valve member, the valve member is moved by the liquid to close the discharge flow path. After the discharge flow path is closed, the discharging device is driven in a reverse direction and then stopped so that the valve member opens the discharge flow path.

The aforementioned and other aspects, features and advantages will become apparent upon consideration of the following description of the preferred embodiments taken in conjunction with the accompanying drawings.

DETAILED DESCRIPTION

The image forming apparatus of this disclosure will be described by reference to drawings. Initially, an example of the image forming apparatus of this disclosure will be described by reference to FIGS. 1 and 2.

Figure 1:
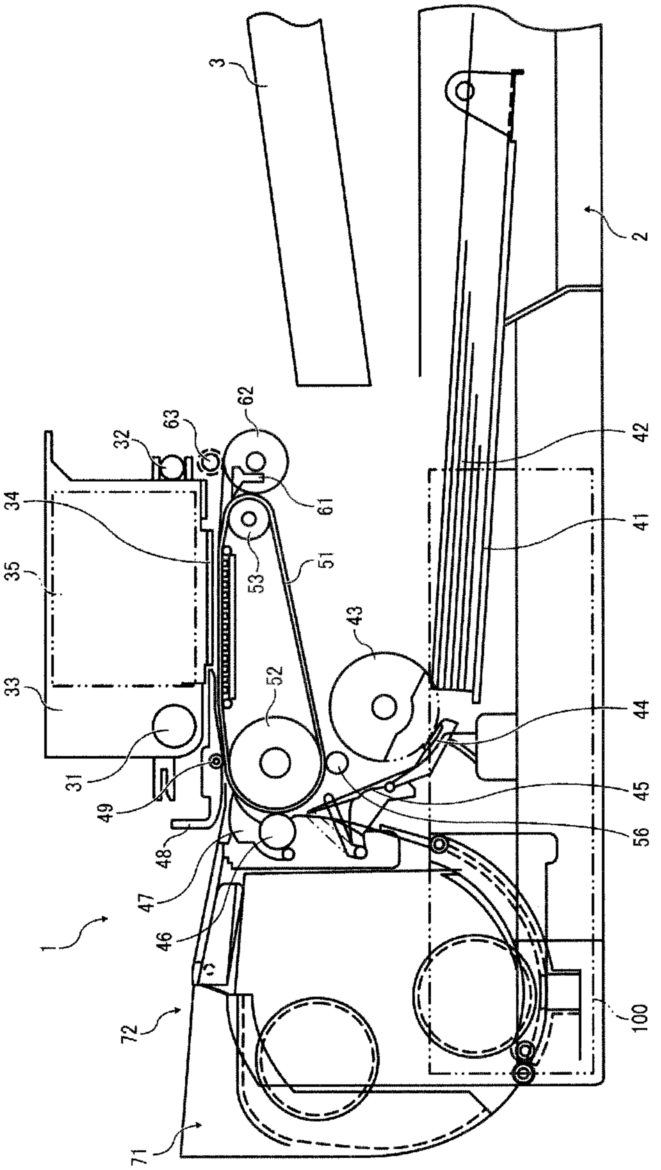
FIG. 1 is a schematic side view illustrating an example of the image forming apparatus of this disclosure.
Figure 2:
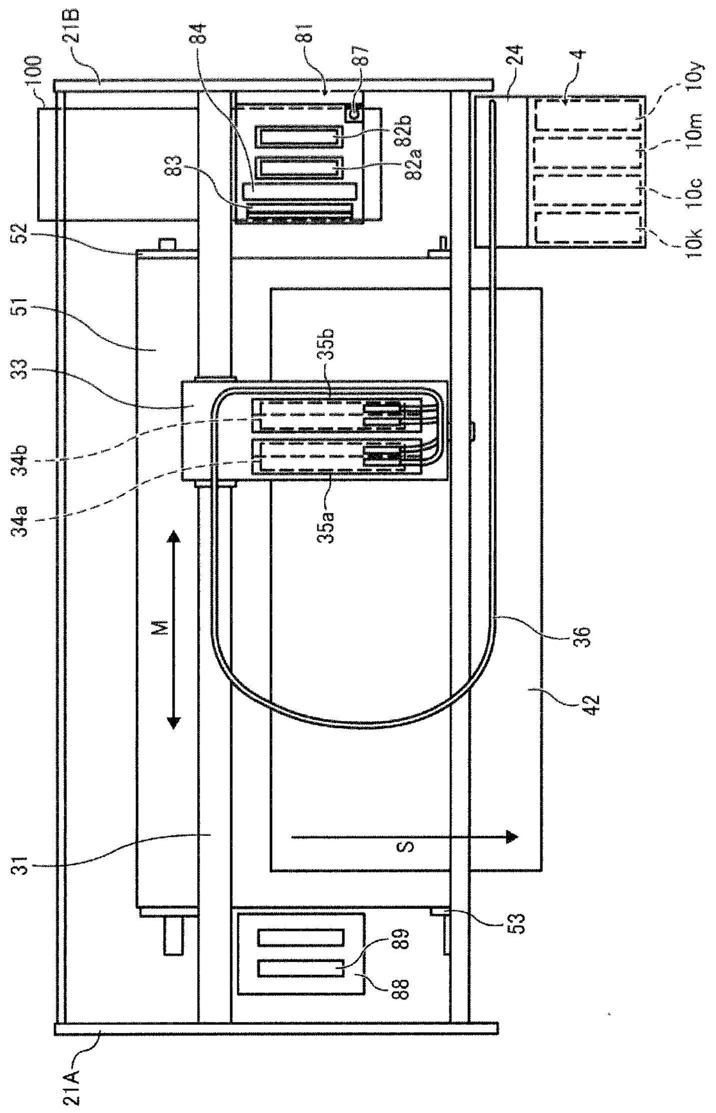
FIG. 2 is a schematic plan view illustrating a main portion of the image forming apparatus illustrated in FIG. 1.

FIG. 1 is a schematic side view illustrating the entire of the image forming apparatus, and FIG. 2 is a schematic plan view illustrating a main portion of the image forming apparatus.

The image forming apparatus illustrated in FIG. 1 is a serial inkjet recording apparatus, and includes a carriage 33, which is slidably supported by a guide member including main and sub guide rods 31 and 32, which are supported by side plates 21A and 21B of a main body 1 of the image forming apparatus, so as to be moved in a main scanning direction M while scanning by a main scanning motor via a timing belt as mentioned below.

The carriage 33 has a recording head 34 including recording heads 34*a* and 34*b* having plural lines of nozzles, which extend in a sub-scanning direction S perpendicular to the main scanning direction M and which downward eject droplets of yellow (Y), cyan (C), magenta (M) and black (K) inks, respectively.

Each of the recording heads 34*a* and 34*b* has two lines of nozzles. One line of the two lines of nozzles of the recording head 34*a* ejects droplets of a black ink, and the other line of nozzles ejects droplets of a cyan ink. In addition, one line of the two lines of nozzles of the recording head 34*b* ejects droplets of a magenta ink, and the other line of nozzles ejects droplets of a yellow ink.

The image forming apparatus has a liquid tank 35 including head tanks 35*a* and 35*b*, which are set on the carriage 33 and which supply the Y, M, C and K color inks to the respective lines of nozzles. The Y, M, C and K color inks are replenished to the head tanks 35*a* and 35*b* from respective ink cartridges 10*y*, 10*m*, 10*c* and 10*k*, which serve as main tanks and which are detachably attached to a cartridge loading portion 4, using a pump unit 24.

In addition, the image forming apparatus has a sheet supplier to supply recording material sheets 42, which are set on a pressure plate 41 of a sheet tray 2, toward the recording heads 34. The sheet supplier includes a semilunar roller (feeding roller) 43, which feeds the sheets 42 one by one, and a separation pad 44, which is opposed to the feeding roller 43 and is made of a material having a large friction coefficient and which is pressed toward the feeding roller 43.

The image forming apparatus has a first guide member 45 to guide the thus fed recording material sheet 42, a counter roller 46, a second guide member 47, a holding member 48 having a pressing roller 49 to hold the recording material sheet 42, and a feeding belt 51, which serves as a sheet feeding device to feed the recording material sheet 42 to such a position as to be opposed to the recording head 34 while electrostatically attracting the sheet.

The feeding belt 51 is an endless belt, which is looped around a feeding roller 52 and a tension roller 53 so as to rotate in a belt feeding direction (i.e., the sub-scanning direction S) and whose surface is charged by a charging roller 56 serving as a charger. The charging roller 56 is contacted with the outer surface of the feeding belt 51 and rotated while driven by the feeding belt 51. The feeding belt 51 is rotated in the belt feeding direction by a sub-scanning motor mentioned below via a timing belt.

The image forming apparatus further has a sheet discharger to discharge the recording material sheet 42, on which an image is recorded by the recording heads 34, toward a copy tray 3. The sheet discharger includes a separation pick 61 to separate the recording material sheet 42 bearing an image thereon from the feeding belt 51, and a combination of a discharging roller 62 and a spur 63, which discharges the recording material sheet 42 bearing an image thereon so as to be stacked on the copy tray 3.

In addition, the image forming apparatus has a duplex-print unit 71, which is used for producing a duplex print and which is detachably attached to the backside of the main body 1. The duplex-print unit 71 reverses the recording material sheet 51, which is fed to the duplex-print unit 71 by the feeding belt 51 which is reversely rotated, so that the recording material sheet 51 is fed again to the nip between the counter roller 46 and the feeding belt 51. The upper surface of the duplex-print unit 71 serves as a manual sheet tray 72, from which a recording material sheet can also be fed toward the recording head 34.

The image forming apparatus further includes a maintenance mechanism 81, which is provided in a non-image-formation area on one side of the apparatus in the main scanning direction to perform a nozzle maintenance operation on the nozzles of the recording head 34 so that the nozzles of the recording head 34 can maintain good conditions or recover from abnormal conditions. The maintenance mechanism 81 includes caps 82 (82*a* and 82*b*) to cap the nozzle surfaces of the recording head 34, a wiper blade 83 serving as a wiper to wipe the nozzle surfaces, an ink receiver 84 to receive droplets of viscous inks ejected from the recording heads in an idle ink ejection operation, and a carriage lock 87 to lock the carriage 33. In addition, a waste ink tank 100 to contain waste inks produced in a nozzle maintenance operation is detachably attached to a portion of the main body 1 below the maintenance mechanism 81.

Another ink receiver 88 is provided in a non-image-formation area on the other side of the image forming apparatus in the main scanning direction to receive droplets of viscous inks ejected from the recording head 34 in an idle ink ejection operation, which is performed in an image recording operation. The ink receiver 88 has openings 89 extending so as to be parallel to the nozzles of the recording head 34.

Next, the image forming operation of the image forming apparatus will be described.

The recording material sheets 42 are fed one by one from the sheet tray 2 while separated from each other, and the thus fed recording material sheet 42 is guided by the first guide 45 so as to be fed substantially vertically. The recording material sheet 42 is further fed while nipped by the feeding belt 51 and the counter roller 46. The front end portion of the recording material sheet 42 is fed while guided by the second guide 47, so that the feeding direction of the recording material sheet 42 is changed at an angle of about 90° (i.e., the sheet is horizontally fed) by the pressing roller 49 and the feeding belt 51.

In this regard, an alternate voltage in which a positive voltage and a negative voltage are alternately output is applied to the charging roller 56, and therefore the feeding belt 51 has a positively charged portion and a negatively charged portion, each of which has a predetermined length and which are alternate in the belt feeding direction (i.e., sub-scanning direction S). Since the feeding belt 51 is rotated and charged, the feeding belt can feed the recording material sheet 42 while attracting the recording material sheet.

When the recording material sheet 42 is fed to an image forming area, in which the recording material sheet is opposed to the recording head 34, the recording material sheet is stopped, and the recording head 34 on the carriage 33 ejects droplets of the inks according to image signals while being moved in the main scanning direction, thereby forming a line of image on the stopped recording material sheet 42. After the recording material sheet 42 is fed in a predetermined length in the sub-scanning direction S, the recording head 34 ejects droplets of the inks to form another line of image. By repeating this image forming operation, an ink image is formed on the recording material sheet 42. Upon receipt of a record end signal or a signal such that the rear edge of the recording material sheet 42 reaches the image forming area, the image forming operation is ended, and the recording material bearing the ink image thereon is discharged from the main body 1 so as to be stacked on the copy tray 3.

When a nozzle maintenance operation is performed, the carriage 33 is moved to a home position at which the carriage is opposed to the maintenance mechanism 81, so that the recording head 34 is capped by the cap 82, and a maintenance operation such as a nozzle sucking operation and an idle ink ejection operation is performed on the recording head 34. Therefore, the recording heads 34 can stably eject droplets of the inks.

Next, the ink supplying section of the image forming apparatus will be described by reference to FIG. 3.

Figure 3:
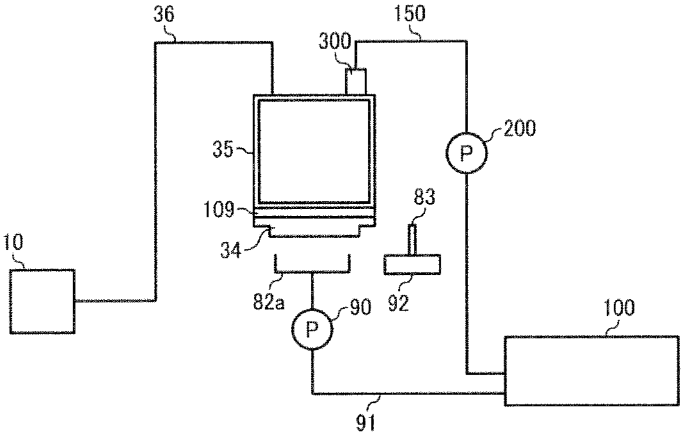
FIG. 3 is a schematic view illustrating an ink supplying section of the image forming apparatus illustrated in FIG. 1.

As illustrated in FIG. 3, the ink cartridge 10 is communicated with the head tank 35 serving as a liquid tank through an ink supply tube 36. A valve unit 300, which serves as a valve to discharge air bubbles, is provided on an upper potion of the head tank 35. The valve unit 300 is connected with an air discharge tube 150, which forms an air flow path and which is connected with a waste liquid tank 100 via a discharging pump 200 serving as a discharging device.

In addition, the ink supplying section includes the suction cap 82*a*. When it is desired to suck the inks in the recording head 34, the nozzle surface is capped with the suction cap 82*a* while a pump 90 is driven to suck the inks so as to be discharged from the nozzles to the cap 82*a*. The thus discharged inks are fed to the waste ink tank 100 through a tube 91. In this regard, the discharged inks may be returned to the ink cartridges 10. In addition, an idle ink ejection operation may be performed to eject the ink toward the cap 82*a*.

The wiper blade 83, which is attached to a wiping unit 92, wipes the nozzle surfaces of the recording head 34 after a maintenance operation, so that the inks can form meniscus in the nozzles.

A filter 109 is provided between the head tank 35 and the recording head 34 to remove foreign materials included in the ink so that a nozzle clogging problem in that the nozzles are clogged with such foreign materials, thereby forming defective images is avoided.

In this regard, the ink cartridge 10 may be a closed container such as an ink bag containing an ink therein, or an open-air container having an air communicating member.

Next, the valve unit 300 will be described in detail by reference to FIG. 4.

The valve unit 300 includes a housing 309 integrated with the head tank 35, an air discharging valve 310 serving as a first valve member to open and close a flow path between a hole 321*a* of a valve sheet 321 and the head tank 35, a biasing spring 350 to bias the air discharging valve 310 toward the head tank 35 so as to open the flow path, the valve sheet 321 which the air discharging valve 310 is contacted with or separated from, an air discharge tube 150, and a second valve 320 to open and close a hole 321*a* of the valve sheet 321, which serves as a flow path between the head tank 35 and an air discharge chamber 365, while being operated in conjunction with the movement of the air discharging valve 310.

More specifically, the air discharging valve 310 (i.e., the first valve member) can have an open state in which the flow path between the hole 321*a* of the valve sheet 321 is opened, or a close state in which the flow path is closed by closing the hole 321*a*. In addition, the second valve 320 can have an open state in which a flow path between the hole 321*a*, and the air discharge chamber 365 and the discharge tube 150 is opened or a close state in which the flow path is closed by closing the hole 321*a*. Thus, when each of the first and second valve members has the open state, the discharge flow path between the valve 300 and the waste liquid tank 100 can be opened.

A communication path 305 is provided in the air discharging valve 310 to communicate the head tank 35 with the flow path between the first valve member and the hole 321*a* of the valve sheet 321. In addition, an elastic sealing member 311 is provided on an upper portion of the air discharging valve 310, which is to be contacted with or separated from the valve sheet 321. The air discharging valve 310 can move up and down in the vertical directions, and is supported by a stopper 301 at the lowest position thereof Since the air discharging valve 310 is connected with the second valve 320 by a connector 319, the second valve 320 is moved in conjunction with the air discharging valve 310.

The air discharge tube 150 is arranged so as to be perpendicular to the air discharging valve 310 in FIG. 3, but the arrangement is not limited thereto as long as air bubbles in the head tank 35 can be satisfactorily discharged therethrough. For example, the air discharge tube 150 may be arranged so as to extend vertically above the valve sheet 321 (i.e., so as to be perpendicular to the valve sheet 321). It is preferable that the sealing member 311 and the second valve 320 consist of two parts to enhance the assembling efficiency.

Next, the air bubble discharging operation of the valve unit 300 will be described by reference to FIGS. 5A-5C.

Figures 5A, 5B, 5C:
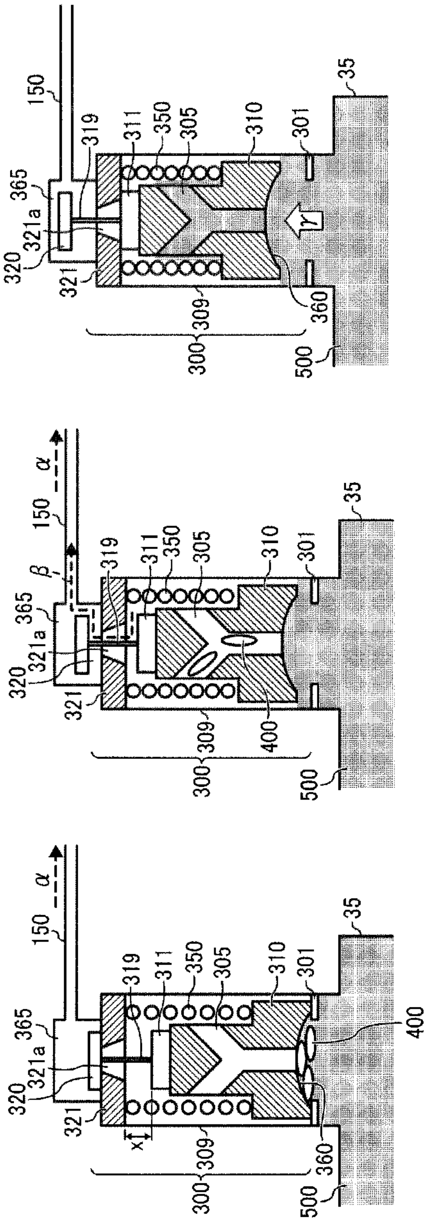
FIGS. 5A-5C are schematic cross-sectional views for explaining an example of the air bubble discharging operation of the valve unit illustrated in FIG. 4.

When air bubbles 400 stay in an upper portion of the head tank 35 near a lower surface 360 of the air discharging valve 310 as illustrated in FIG. 5A and the discharging pump 200 is driven in a forward direction so that air in the valve unit 300 flows in a direction α, the insides of the air discharge tube 150 and the air discharge chamber 365 have a negative pressure. In this regard, when the internal pressure of the discharge tube 150 and the air discharging chamber 365 becomes lower than that of the head tank 35 and the force caused by the pressure difference therebetween is greater than the biasing force of the biasing spring 350, the air discharging valve 310 is raised and the second valve 320 is also raised as illustrated in FIG. 5B, thereby allowing the second valve 320 to achieve the open state.

After the second valve 320 achieves the open state, the air bubbles 400 pass through the communication path 305 of the air discharging valve 310 at a high speed due to the large pressure difference, and are fed to the air discharge tube 150 after passing through the hole 321*a* of the valve sheet 321 as illustrated by an arrow β in FIG. 5B. In this regard, the viscosity of air is 0.018 cP at 20° C., which is 1/55 times the viscosity of water. Since the viscosity of air is thus small, the resistance of air is small when air passes through the communication path 305, and therefore the pressure loss is small. Therefore, the air discharging valve 310 can maintain the open state even after the air bubbles 400 pass through the communication path 305.

After the air bubbles 400 pass through the communication path 305, an ink 500 in the head tank 35 flows through the communication path 305. In this regard, the viscosity of the ink 500 is about 3.0 cP, which is greater than the viscosity of water. Therefore, the resistance of the ink 500 passing through the communication path 305 is 166 times the resistance of the air bubbles 400. Therefore, when the ink 500 flows through the communication path 305 after the air bubbles 400 pass through the communication path 305, the pressure of the ink flowing the communication path 305 is relatively low compared to the ink present below the lower surface 360 of the air discharging valve 310, resulting in formation of a pressure difference therebetween.

When such a pressure difference is formed, the air discharging valve 310 receives a force from a direction γ as illustrated in FIG. 5C, and thereby the air discharging valve 310 is moved upward (i.e., toward the valve sheet 321). Therefore, the sealing member 311 is contacted with the lower surface of the valve sheet 321, thereby closing the hole 321*a*. Therefore, it is prevented that the ink 500 in the head tank 35 excessively flows to the discharge tube 150, resulting in prevention of wasteful consumption of the ink in the air bubble discharging operation.

After the hole 321*a* of the valve sheet 321 is closed by the sealing member 311 and then the discharging pump 200 is stopped, the air discharging valve 310 is moved downward by the biasing force of the biasing spring 350. In this regard, since the second valve 320 is also moved downward, the hole 321*a* is closed by the second valve 320. Therefore, air in the air discharge chamber 365 is prevented from flowing into the head tank 35 because the air discharging chamber 365 and the air discharge tube 150 are disconnected with the head tank 35.

When the air discharging valve 310 is moved downward, it may be possible that the ink 500 in the head tank 35 passes through the communication path 305, and flows into a portion between the air discharging valve 310 and the biasing spring 350. However, the ink 500 flows in a direction opposite to the discharge flow path of from the first valve member 310 to the discharge tube 150 and remains there, and therefore the ink does not prevent discharging of the air bubbles 400.

In addition, when the discharging pump 200 is driven while the ink 500 stays at the communication path 305 of the air discharging valve 310, the ink 500 is allowed to flow toward the discharge tube 150 due to negative pressure caused by the discharge pump 200. However, since the ascending force of the air bubbles 400 has priority, the air bubbles 400 flow to the discharge tube 150.

In this regard, in order to prevent occurrence of pressure change in the head tank 35 when the air discharging valve 310 is moved downward, it is preferable to provide a damper, such as a flexible film and a combination of a flexible film and a biasing spring to bias the film outward, on at least one side wall of the head tank 35.

Further, it is preferable to cap the nozzle surface with the suction cap 82*a* or the like in a period of from stopping of the discharging pump 200 and falling of the air discharging valve 310 to prevent occurrence of a problem in that the ink drops from the nozzles of the recording head due to change of pressure in the head tank 35.

As illustrated in FIGS. 5A-5C, the lower surface 360 of the air discharging valve 310 is preferably recessed toward the communication path 305, so that the air bubbles 400 can stay below the lower surface 360 (i.e., at the entrance of the communication path 305). In this case, the air bubbles 400 can be securely flown from the communication path 305 to the discharge tube 150 when the discharging pump 200 is driven.

In order that the air discharge chamber 365 and the air discharge tube 150 are securely sealed off from the air discharging valve 310, the sealing member 311 is preferably made of an elastomer having good resistance to the ink. Similarly, in order that the second valve 320 is securely sealed off from the valve sheet 321, the second valve 320 is preferably made of an elastomer having good resistance to the ink. The cross-section of the communication path 305 is not particularly limited, but the communication path 305 preferably has ink flow resistance such that the force of raising the air discharging valve 310 caused by the pressure difference formed when the ink 500 passes the communication path 305 is greater than the biasing force of the biasing spring 350.

Figure 4:
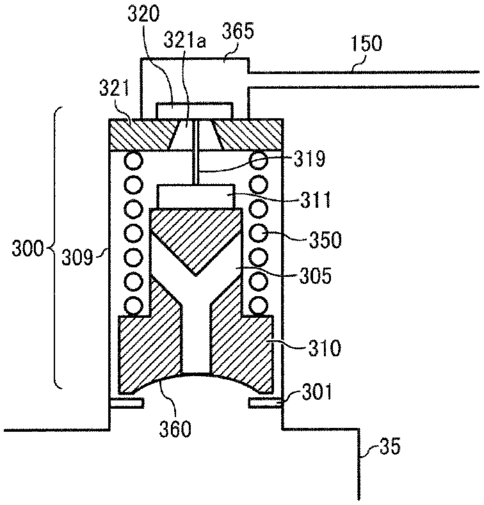
FIG. 4 is a schematic cross-sectional view illustrating a valve unit of the ink supplying section illustrated in FIG. 3.

In addition, the communication path 305 preferably has a structure such that air bubbles 400 passing through the communication path 305 can be smoothly flown to the discharge tube 150 due to the ascending force thereof For example, it is preferable that the communication path 305 is slanting as illustrated in FIG. 4 so that the air bubbles 400 can be easily moved upward. In this case, the air bubbles 400 can easily flow toward the discharge tube 150, resulting in enhancement of the air bubble discharging efficiency.

When the flow rate of air flown by suction of the discharging pump 200 is too large, the air discharging valve 310 is quickly closed, and therefore the air bubble discharging operation cannot be satisfactorily performed. In contrast, the air flow rate is too small, the air discharging valve 310 cannot achieve the close state, and therefore not only the air bubbles 400 but also the ink 500 flow through the air discharge tube 150. Therefore, it is preferable to previously determine the optimum air suction rate of the discharging pump 200.

In addition, in a case where the discharging pump 200 is not driven, the valve sheet 321 and the sealing member 311 are separated by a distance x as illustrated in FIG. 5A. When the distance x is too long, it takes time for the air discharging valve 310 to close the flow path between the head tank 35 and the hole 321*a*, and thereby the ink 500 is flown into the discharge tube 150. In contrast, when the distance x is too short, the air discharging valve 310 is quickly closed, and therefore the air bubble discharging operation cannot be satisfactorily performed. Therefore, it is preferable to previously determine the optimum distance for the distance x.

The discharging pump 200 is needed to be able to form such a negative pressure as to move the air discharging valve 310. In this regard, in a case where a pump such as a tube pump, which closes the flow path, is used, when the air discharging valve 310 is raised once, the discharge tube is close the flow path, and thereby a problem in that the air discharging valve 310 is not moved downward can be caused. The method of preventing occurrence of the problem will be described later.

As mentioned above, in this example the valve unit includes the first valve member having the communication path to connect the liquid tank with the discharge flow path; the valve sheet located on the discharge flow path and having the opening serving as a part of the discharge flow path; the biasing member to bias the first valve member in such a direction that the first valve member is separated from the valve sheet; and the second valve member to open and close the discharge flow path in conjunction with the movement of the first valve member.

When the discharging device is not driven, the first valve member opens the discharge flow path (i.e., the first valve member has an open state) while the second valve member closes the discharge flow path (i.e., the second valve member has a close state). When the discharging device starts to be driven, the second valve member achieves an open state, and the first valve member maintains the open state even when air flows through the first valve member while the second valve member is in the open state.

However, when a liquid in the head tank flows through the communication path of the first valve member, the first valve member achieves a close state while the second valve member maintains the open state. Thus, the valve unit has a simple structure and can securely discharge air bubbles in the head tank without performing a complex control operation while reducing the amount of waste liquid.

Next, a second example of the valve unit for use in the image forming apparatus of the present invention will be described by reference to FIGS. 6 and 7.

Figure 6:
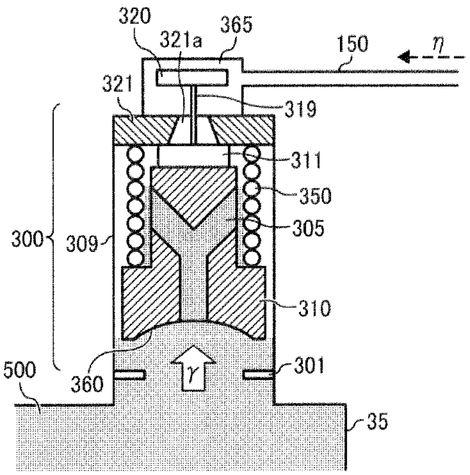
FIG. 6 is a schematic cross-sectional view illustrating a valve unit of another ink supplying section.
Figure 7:
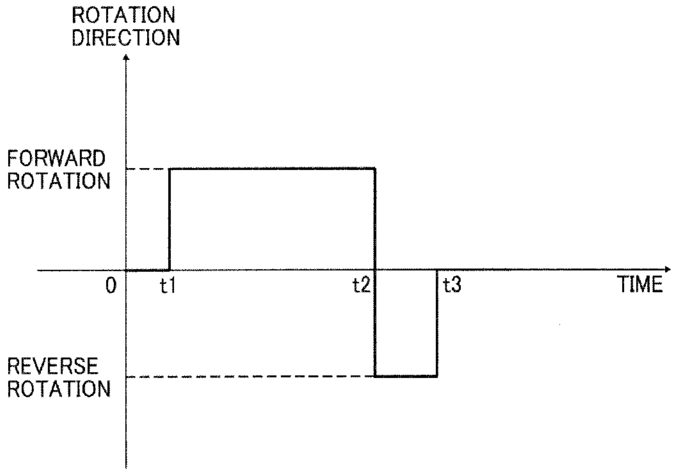
FIG. 7 is a schematic view for explaining the driving operation of a discharging pump used for the ink supplying section having the valve unit illustrated in FIG. 6.

FIG. 6 is a schematic cross-sectional view illustrating a valve unit of another example of the ink supplying section; and FIG. 7 is a schematic view for explaining the driving operation of a discharging pump for use in the ink supplying section having the valve unit illustrated in FIG. 6.

In this example, a tube pump, which achieves a close state when being stopped, is used as the discharging pump 200. As mentioned above in the first example, when the discharging pump 200 is driven in a forward direction to flow air from the air discharge tube 150 to the waste ink tank 100, the air discharge valve 310 is raised so that the seal member 311 of the air discharging valve 310 is contacted with the valve sheet 321. In this regard, when the discharging pump 200 is a tube pump, which is a reversible pump and which always closes the discharge tube 150, the pressure difference between the negative pressure in the discharge flow path (i.e., the air discharging chamber 365 and the air discharge tube 150) and the pressure in the head tank 35 is not reduced, a problem in that the air discharging valve 310 is not moved downward is caused.

Therefore, it is preferable that the operation of the discharging pump 200 is controlled as illustrated in FIG. 7. Specifically, the discharging pump 200 is rotated in a forward direction from a time t1 to a time t2 to perform an air discharging operation such that air is flown in a direction of from the air discharge chamber 365 to the waste ink tank 100. In addition, when the discharging pump 200 is stopped, the rotation direction of the pump 200 is changed from the forward rotation direction to the reverse rotation direction at the time t2, and then the discharging pump 200 is rotated in the reverse direction from the time t2 to a time t3.

By reversely rotating the discharging pump 200, the pressure difference between the ink in the head tank 35, and the discharge flow path (i.e., the air discharging chamber 365 and the discharge tube 150) can be reduced, thereby making it possible to move the air discharging valve 310 downward. In FIG. 6, reference character η represents the direction of airflow when the discharging pump 200 is reversely rotated.

In this regard, in order to securely performing the air discharging operation, the forward rotation time (t2-t1) is preferably longer than the reverse rotation time (t3-t2). In addition, in the air discharging operation illustrated in FIG. 7, the reverse rotation operation of the discharging pump 200 is performed just after the forward rotation operation. However, the air discharging operation is not limited thereto, and the reverse rotation operation can be performed after the forward rotation operation with a pause with a predetermined time therebetween.

Figure 8C:
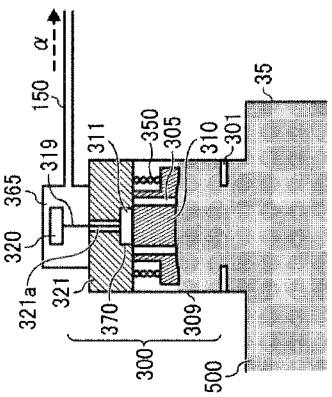
FIGS. 8A-8C are schematic views for explaining the air bubble discharging operation of another valve unit of the ink supplying section.
Figure 8B:
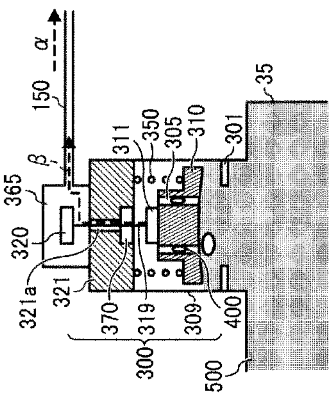
Figure 8A:
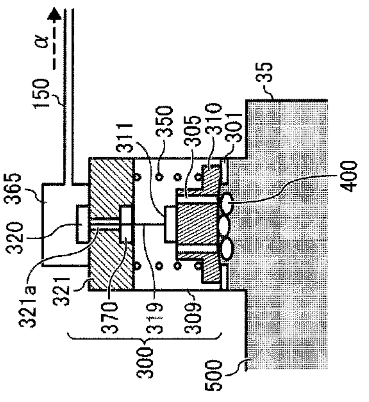

Next, a third example of the valve unit will be described by reference to FIGS. 8A-8C. FIGS. 8A-8C are schematic views for explaining the air bubble discharging operation of the third example of the valve unit.

In this example, the communication path 305 of the air discharging valve 310 is strait. Therefore, the communication path 305 is simpler than the branched communication path 305 illustrated in FIG. 4, and the preparation time of the communication path can be shortened, resulting in reduction of the costs of the valve unit. In addition, the air discharging valve 310 illustrated in FIG. 4 is longer in the direction of gravitational force because of having the branched communication path 305. In contrast, the communication path 305 in this example is strait, and therefore the length of the air discharging valve 310 in the direction of gravitational force can be shortened, resulting in miniaturization of the valve unit.

In addition, the valve unit 300 of this example has a structure such that the seal member 311 of the air discharging valve 310 is engageable with a recessed portion 370 of the valve sheet 321. Therefore, the height of this valve unit 300 can be further shortened.

The air discharging operation of this valve unit 300 will be described by reference to FIGS. 8A-8C.

When air bubbles 400 stay in an upper portion of the head tank 35 (i.e., below the lower surface of the air discharging valve 310) as illustrated in FIG. 8A, the discharging pump 200 is rotated in the forward direction to flow air in the direction α. In this case, the inside of the discharge flow path (i.e., the discharge tube 150 and the air discharging chamber 365) has a negative pressure. When the internal pressure of the discharge flow path becomes lower than that of the head tank 35 and the pressure difference becomes greater than the biasing force of the biasing spring 350, the air discharging valve 310 is raised, and thereby the second valve 320 is opened as illustrated in FIG. 8B.

Just after the second valve 320 is opened, the air bubbles 400 are fed through the communication path 305 at a high speed due to a large pressure difference, and then fed to the discharge tube 150 via the hole 321*a* of the valve sheet 321 as illustrated by an arrow β. In this regard, the air discharging valve 310 maintains the open state even when the air bubbles 400 are fed through the communication path 305.

After the air bubbles 400 present in the upper portion of the head tank 35 are fed through the communication path 305, the ink 500 in the head tank 35 is flown through the communication path 305. In this case, the air discharging valve 310 receives a force from below as illustrated in FIG. 8C, and is moved upward (i.e., in a direction toward the valve sheet 321). As a result, the hole 321*a* is closed by the seal member 311 of the air discharging valve 310, and therefore the ink 500 is prevented from being excessively flown toward the air discharge tube 150, resulting in reduction of waste ink consumption in the air discharging operation.

Figure 9A:
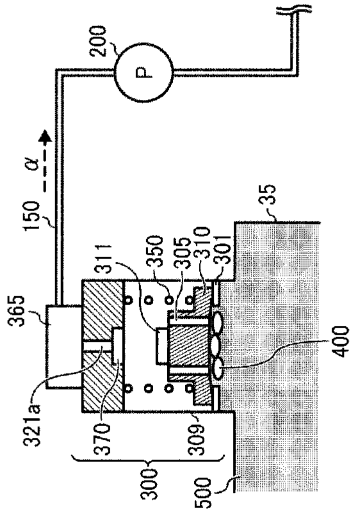
FIGS. 9A and 9B are schematic views for explaining the air bubble discharging operation of another valve unit for use in the ink supplying section.
Figure 9B:
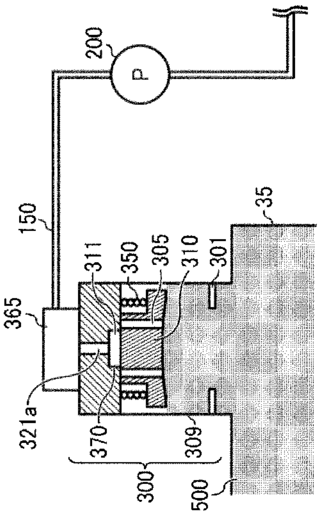

Next, a fourth example of the valve unit will be described by reference to FIGS. 9A-9B. FIGS. 9A-9B are schematic views for explaining the air bubble discharging operation of the fourth example of the valve unit.

In this example, the second valve 320 is not used, and a tube pump, which is a reversible pump and which always closes the discharge tube 150 whenever being stopped, is used as the discharge pump 200. When the second valve 320 is present, there is a case where the valve sheet 321 is not satisfactorily sealed off from the air discharge tube 150 depending on the operation of the air discharging valve 310. Therefore, in this example, the second valve 320 is not used while using a tube pump as the discharge pump 200, which is reversely rotated after performing the air discharging operation similarly to the second example of the valve unit mentioned above.

Specifically, when the air bubbles 400 stay in an upper portion of the head tank 35 as illustrated in FIG. 9A, the discharging pump 200 is rotated in the forward direction to flow air in the direction a. Therefore, the inside of the discharge flow path (the air discharge tube 150 and the air discharge chamber 365) has a negative pressure, and thereby the air bubbles 400 are fed through the communication path 305 at a high speed, and then fed to the air discharge tube 150 via the hole 321*a* of the valve sheet 321. In this case, the air discharging valve 310 maintains the open state even when the air bubbles 400 are fed through the communication path 305.

After the air bubbles 400 present in the upper portion of the head tank 35 are fed through the communication path 305, the ink 500 in the head tank 35 is flown through the communication path 305. In this case, the air discharging valve 310 receives a force from below as illustrated in FIG. 9B, and is moved upward (i.e., in a direction toward the valve sheet 321). As a result, the hole 321*a* is closed by the seal member 311 of the air discharging valve 310, and therefore the ink 500 is prevented from being excessively flown toward the discharge tube 150, resulting in reduction of waste ink consumption in the air discharging operation.

Thereafter, the rotation direction of the discharge pump 200 is changed from the forward rotation direction to the reverse rotation direction. In this case, the difference between the pressure in the discharge flow path (the air discharging chamber 365 and the discharge tube 150) and the pressure in the head tank 35 is reduced, and thereby the air discharging valve 310 is moved downward by the biasing force of the biasing spring 350.

In this example, it is not necessary to consider sealing off the valve sheet 321 from the air discharge tube 150. In addition, the second valve 320 is not provided, the assembling time can be shortened while the number of parts is decreased. In this regard, it is necessary that the discharging pump 200 is a pump such as a tube pump, which always closes the discharge tube 150, and is reversely rotated after the air discharging operation is ended to move the air discharging valve 310 downward.

As mentioned above, this valve unit includes a valve member which has a communication path to connect the liquid tank with the discharge flow path and which is movable to open or close the discharge flow path; a valve sheet which is located on the discharge flow path and which has an opening serving as a part of the discharge flow path, wherein the valve member is movable so as to be contacted with or separated from the valve sheet to close or open the discharge flow path;

and a biasing member to bias the valve member in such a direction that the valve member is separated from the valve sheet.

When the discharging device is not driven, the valve member has the open state. When the discharging device starts to be driven in a forward direction, the valve member maintains the open state even when air flows through the communication path of the valve member. However, when a liquid flows through the communication path of the valve member, the valve member achieves the close state. After the valve member achieves the close state, the discharging device is reversely rotated and then stopped so that the valve member achieves the open state. Thus, the valve unit of this example has a simple structure and can satisfactorily discharge air bubbles in the head tank without performing complex control while reducing the waste ink consumption in the air discharging operation.

Figure 10C:
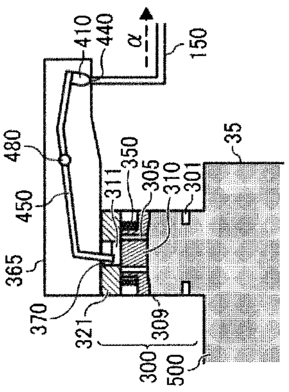
FIGS. 10A-10C are schematic views for explaining the air bubble discharging operation of another valve unit for use in the ink supplying section.
Figure 10B:
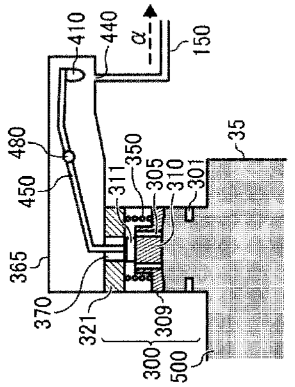
Figure 10A:
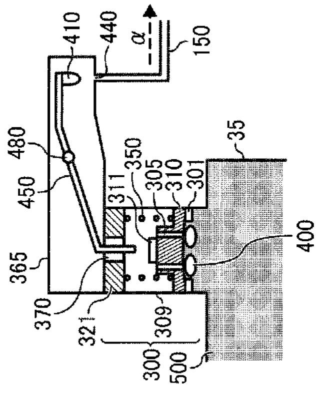

Next, a fifth example of the valve unit will be described by reference to FIGS. 10A-10C. FIGS. 10A-10C are schematic views for explaining the air bubble discharging operation of the fifth example of the valve unit.

In this example, a leverage is provided in the air discharge chamber 365. Specifically, a leverage 450 rotatable on a fulcrum 480 is provided in the air discharge chamber 365. One end of the leverage 365 is opposed to the sealing member 311 while passing through the hole 321*a* of the valve sheet 321, and the other end of the leverage 365 has an opening/closing valve 410 (hereinafter referred to as a third valve) to open and close an opening 440 of the discharge tube 150, at which the air discharge tube 150 is connected with the air discharge chamber 365.

When the discharging pump 200 is driven, air is discharged in the direction a as illustrated in FIG. 10A, and the air bubbles 400 present in an upper portion of the head tank 35 are discharged through the discharge flow path (the air discharging chamber 365 and the discharge tube 150). After the ink 500 is flown through the communication path 305, a pressure difference is caused between the pressure of ink in the head tank 35 and the pressure in the air discharging chamber 365, thereby raising the air discharging valve 310. In this case, the leverage 450 starts to be rotated on the fulcrum 480 as illustrated in FIG. 10B. When the air discharging valve 310 is further raised, the leverage 450 is further rotated and the third valve 410 closes the opening 440 of the air discharge tube 150 as illustrated in FIG. 10C. Thus, this valve unit can discharge the air bubbles 400 without feeding the ink 500 through the air discharge tube 150.

As the length of a portion (i.e., the left portion in FIG. 10) of the leverage 450 on the side of the air discharging valve 310 is increased, the force of closing the opening 440 is increased, and thereby the third valve 410 can be securely sealed from the discharge tube 150.

In this example, when a pump such as a tube pump, which always closes the discharge tube 150, is used as the discharging pump 200, the pump is reversely rotated after the opening 440 is closed, to move the air discharging valve 310 downward.

Figure 11:
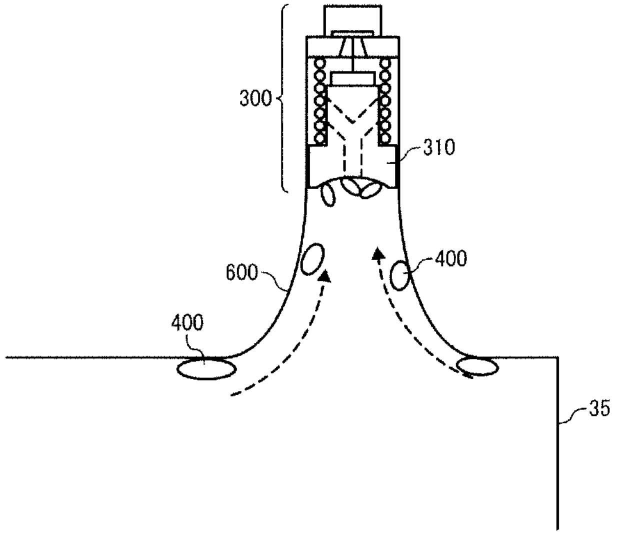
FIG. 11 is a schematic view illustrating another valve unit for use in the ink supplying section.

Next, a sixth example of the image forming apparatus will be described by reference to FIG. 11. FIG. 11 is a schematic cross-sectional view illustrating the sixth example of the image forming apparatus.

As illustrated in FIG. 11, a convergent flow path 600, whose width is decreased in the upper direction, is provided on the head tank 35 to connect the head tank with and the valve unit 300.

It is preferable for the image forming apparatus of the present application that the air bubbles 400 gather below the lower surface of the air discharging valve 310, because the air bubbles 400 can be discharged only by one air discharging operation. Therefore, in this sixth example, the convergent flow path 600 is provided between the head tank 35 and the valve unit 300 so that the air bubbles 400 can be smoothly flown along the inner surface of the flow path 600 due to the ascending force as illustrated by broken lines in FIG. 11 and are automatically gathered below the lower surface of the air discharging valve 310. In this regard, the shape of the convergent flow path 600 is not limited to that of the flow path illustrated in FIG. 11, and any convergent flow paths such as tapered flow paths and the like can also be used as long as the flow paths have a structure such that the width thereof is decreased in the upward (extending) direction thereof and air bubbles can be smoothly raised along the surface of the flow paths.

Figure 12:
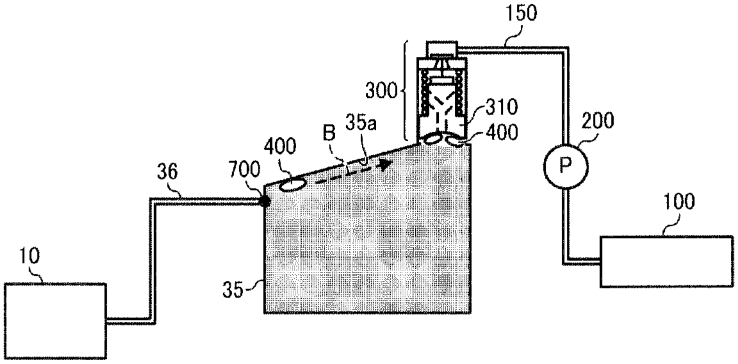
FIG. 12 is a schematic view illustrating another ink supplying section for use in the image forming apparatus illustrated in FIG. 11.

Next, a seventh example of the image forming apparatus will be described by reference to FIG. 12. FIG. 12 is a schematic cross-sectional view illustrating the seventh example of the image forming apparatus.

As illustrated in FIG. 12, an upper surface 35*a* of the head tank 35 is slanting so as to rise toward the valve unit 300 (i.e., rise obliquely upward).

Since the head tank 35 has such a structure, the air bubbles 400 in the head tank 35, which are formed by air fed into the supply tube 36 when the ink cartridge 10 is replaced or air fed into the supply tube 36 by passing through the tube, are moved while rising along the upper surface 35*a* as illustrated by a broken line B in FIG. 12 by the ascending force. Since the thus moved air bubbles 400 gather below the lower surface of the valve unit 300, the air bubbles 400 can be easily discharged only by one air discharging operation, resulting in enhancement of the efficiency of the air discharging operation. It is preferable that the upper surface of the head tank 35 is slanting so as to rise toward the valve unit 300 from a connection 700 between the supply tube 36 and the head tank 35.

Although the above-mentioned examples of the image forming apparatus are serial image forming apparatus, the image forming apparatus of this disclosure is not limited thereto, and can be a line image forming apparatus.

Additional modifications and variations of this disclosure are possible in light of the above teachings. It is therefore to be understood that within the scope of the appended claims the invention may be practiced other than as specifically described herein.

What is claimed is:

1. An image forming apparatus comprising:

a recording head having nozzles to eject droplets of a liquid;

a liquid tank to store the liquid to be supplied to the recording head;

a waste liquid tank to store a waste of the liquid;

a valve located on the liquid tank while communicating therewith;

a discharge flow path connecting the valve with the waste liquid tank; and a discharging device located on the discharge flow path to feed a fluid from the liquid tank to the waste liquid tank, wherein the valve includes:

a first valve member, which has a communication path connecting the liquid tank with the discharge flow path and which is movable to open and close the discharge flow path;

a valve sheet located on the discharge flow path and having an opening serving as a part of the discharge flow path, wherein the first valve is contacted with or separated from the valve sheet to close or open the discharge flow path;

a biasing member to bias the first valve member in such a direction that the first valve member is separated from the valve sheet; and a second valve member to open and close the discharge flow path in conjunction with movement of the first valve member, and wherein when the discharging device is not driven, the first valve member opens the discharge flow path while the second valve member closes the discharge flow path, and when the discharging device starts to be driven, the second valve member opens the discharge flow path while the first valve member keeps the discharge flow path opening even though air flows to the discharge flow path through the communication path of the first valve member, whereas, in a case in which the liquid flows through the communication path of the first valve member, the first valve member is moved by the liquid to close the discharge flow path while the second valve member keeps the discharge flow path opening.

2. The image forming apparatus according to claim 1, wherein the discharging device is a reversible discharging device which closes the discharge flow path when being stopped, and wherein after the discharging device is driven in a forward direction to feed the fluid including at least air from the liquid tank to the waste liquid tank, the discharging device is driven in a reverse direction and then stopped.

3. The image forming apparatus according to claim 2, wherein a period of time in which the discharging device is driven in the reverse direction is shorter than a period of time in which the discharging device is driven in the forward direction.

4. The image forming apparatus according to claim 1, wherein a lower surface of the first valve member relative to a direction of gravitational force is concaved.

5. The image forming apparatus according to claim 1, wherein a front portion of the communication path facing the discharge flow path is slanting relative to an upper surface of the liquid tank.

6. The image forming apparatus according to claim 1, wherein the first valve member has a sealing member engageable with the opening of the valve sheet.

7. The image forming apparatus according to claim 1, further comprising:

a flow path located between the liquid tank and the valve to communicate the liquid tank with the first valve member, wherein the flow path is convergent toward the first valve member.

8. The image forming apparatus according to claim 1, wherein the liquid tank has an upper surface slanting so as to rise toward the valve.

9. An image forming apparatus comprising:

a recording head having nozzles to eject droplets of a liquid;

a liquid tank to store the liquid to be supplied to the recording head;

a waste liquid tank to store a waste of the liquid;

a valve located on the liquid tank while communicating therewith;

a discharge flow path connecting the valve with the waste liquid tank; and a discharging device located on the discharge flow path to feed a fluid from the liquid tank to the waste liquid tank, wherein the discharging device is a reversible discharging device to close the discharge flow path when being stopped, and the valve includes:

a valve member, which has a communication path connecting the liquid tank with the discharge flow path and which is movable to open and close the discharge flow path;

a valve sheet located on the discharge flow path and having an opening serving as a part of the discharge path, wherein the valve member is contacted with or separated from the valve sheet to close or open the discharge flow path; and a biasing member to bias the valve member in such a direction that the valve member is separated from the valve sheet, and wherein when the discharging device is not driven, the valve member opens the discharge flow path, and when the discharging device is driven in a forward direction, the valve member keeps the discharge flow path opening even though air flows through the communication path of the valve member, whereas, in a case in which the liquid flows through the communication path of the valve member, the valve member is moved by the liquid to close the discharge flow path, wherein after the discharge flow path is closed, the discharging device is driven in a reverse direction and then stopped.

10. The image forming apparatus according to claim 9, wherein a period of time in which the discharging device is driven in the reverse direction is shorter than a period of time in which the discharging device is driven in the forward direction.

11. The image forming apparatus according to claim 9, wherein a lower surface of the first valve member relative to a direction of gravitational force is concaved.

12. The image forming apparatus according to claim 9, wherein a front portion of the communication path facing the discharge flow path is slanting relative to an upper surface of the liquid tank.

13. The image forming apparatus according to claim 9, wherein the first valve member has a sealing member engageable with the opening of the valve sheet.

14. The image forming apparatus according to claim 9, further comprising:

a flow path located between the liquid tank and the valve to communicate the liquid tank with the first valve member, wherein the flow path is convergent toward the valve member.

15. The image forming apparatus according to claim 9, wherein the liquid tank has an upper surface slanting so as to rise toward the valve.

16. An image forming apparatus comprising:

a recording head having nozzles to eject droplets of a liquid;

a liquid tank to store the liquid to be supplied to the recording head;

a waste liquid tank to store a waste of the liquid;

a valve located on the liquid tank while communicating therewith;

a discharge flow path connecting the valve with the waste liquid tank; and a discharging device located on the discharge flow path to feed a fluid from the liquid tank to the waste liquid tank, wherein the valve includes:

a first valve member, which has a communication path connecting the liquid tank with the discharge flow path and which is movable to open and close the discharge flow path;

a valve sheet located on the discharge flow path and having an opening serving as a part of the discharge flow path, wherein the first valve is contacted with or separated from the valve sheet to close or open the discharge flow path;

a biasing member to bias the first valve member in such a direction that the first valve member is separated from the valve sheet; and a second valve member to open and close the discharge flow path in conjunction with movement of the first valve member, and wherein when the discharging device is not driven, the first valve member opens the discharge flow path while the second valve member opens the discharge flow path, and when the discharging device starts to be driven, the first and second valve members keep the discharge flow path opening even though air flows to the discharge flow path through the communication path of the first valve member, whereas, in a case in which the liquid flows through the communication path of the first valve member while the first and second valve members open the discharge flow path, the first valve member is moved by the liquid and the second valve member is moved to close the discharge flow path in conjunction with movement of the first valve member.

17. The image forming apparatus according to claim 16, wherein the valve includes:

a leverage located between the first valve member and the second valve member, and wherein the second valve member is located on an end of the leverage, and the first valve member is opposed to another end of the leverage and is contacted with the end when moved by the liquid.

* * * * *